(12) United States Patent
Trimberger

(10) Patent No.: US 8,892,903 B1
(45) Date of Patent: Nov. 18, 2014

(54) DETECTION OF POWER ANALYSIS ATTACKS

(71) Applicant: Xilinx, Inc., San Jose, CA (US)

(72) Inventor: Stephen M. Trimberger, Incline Village, NV (US)

(73) Assignee: Xilinx, Inc., San Jose, CA (US)

( * ) Notice: Subject to any disclaimer, the term of this patent is extended or adjusted under 35 U.S.C. 154(b) by 106 days.

(21) Appl. No.: 13/706,660

(22) Filed: Dec. 6, 2012

(51) Int. Cl.
G06F 21/70 (2013.01)
G06F 21/55 (2013.01)

(52) U.S. Cl.
CPC ..................................... G06F 21/55 (2013.01)
USPC ............................................ 713/189; 726/23

(58) Field of Classification Search
CPC . H04L 63/1408; H04L 63/1441; G06F 21/70; G06F 21/72
USPC ...................... 713/189, 194; 726/23
See application file for complete search history.

(56) References Cited

U.S. PATENT DOCUMENTS

| | | | | |
|---|---|---|---|---|
| 6,895,509 | B1 * | 5/2005 | Clark ............................... | 726/23 |
| 7,555,787 | B2 * | 6/2009 | Clercq ............................. | 726/34 |
| 8,650,408 | B2 * | 2/2014 | Trimberger .................... | 713/187 |
| 2002/0051546 | A1 * | 5/2002 | Bizjak ........................... | 381/106 |
| 2006/0017501 | A1 * | 1/2006 | Nodake ......................... | 330/141 |
| 2006/0229022 | A1 * | 10/2006 | Bu et al. ......................... | 455/69 |
| 2007/0058452 | A1 * | 3/2007 | Kim et al. ................ | 365/189.05 |
| 2007/0182421 | A1 * | 8/2007 | Janke et al. .................... | 324/522 |
| 2009/0086962 | A1 * | 4/2009 | Fujisaki et al. ................ | 380/28 |
| 2010/0250971 | A1 * | 9/2010 | Walmsley .................... | 713/194 |
| 2011/0128030 | A1 * | 6/2011 | Wuidart .................... | 324/762.01 |
| 2011/0145595 | A1 * | 6/2011 | Kim et al. ...................... | 713/189 |
| 2012/0060037 | A1 | 3/2012 | Trimberger | |
| 2012/0060038 | A1 | 3/2012 | Trimberger | |
| 2013/0278284 | A1 * | 10/2013 | Watanabe et al. ................. | 326/8 |

OTHER PUBLICATIONS

Yanci et al., "Characterization of a Voltage Glitch Attack Detector for Secure Devices", 2009, Symposium on Bio-inspired Learning and Intelligent Systems for Security, IEEE Computer Society, pp. 91-96.*
U.S. Appl. No. 12/791,608, filed Jun. 1, 2010, Bridgford et al.
U.S. Appl. No. 12/900,805, filed Oct. 8, 2010, Bridgford et al.
Masle, Adrien Le et al., "Detecting Power Attacks on Reconfigurable Hardware" 22$^{nd}$ *International Conference on Field Programmable Logic and Applications*, Aug. 29, 2012, pp. 1-6, www.fpl2012.org.
Peterson, Ed, *Developing Tamper Resistant Designs with Xilinx Virtex-6 and 7 Series FPGAs*, XAPP1084 (v1.0), Sep. 21, 2011, pp. 1-17, Xilinx, Inc., San Jose, California, USA.

* cited by examiner

*Primary Examiner* — Matthew Smithers
(74) *Attorney, Agent, or Firm* — LeRoy D. Maunu

(57) ABSTRACT

A circuit for detecting power analysis attacks includes at least one load circuit, a power supply line, and a switch coupled to the load circuit and to the power supply line. The switch is configured to enable and disable the at least one load circuit, and a voltage monitor is configured to sample voltage levels of the supply voltage. A detection circuit is coupled to the switch and to the voltage monitor. The detection circuit is configured to generate control signals for enabling and disabling the at least one load circuit, compare a first voltage level sampled when the at least one load circuit is disabled to a second voltage level sampled when the at least one load circuit is enabled, and generate an attack-detection signal in response to a difference between the sampled first voltage level and the sampled second voltage level being greater than a threshold voltage level.

20 Claims, 4 Drawing Sheets

DETECTION OF POWER ANALYSIS ATTACKS

TECHNICAL FIELD

The disclosure generally relates to detecting power analysis attacks on integrated circuits.

BACKGROUND

Programmable logic circuits are integrated circuits (ICs) that are user configurable and capable of implementing digital logic operations. There are several types of programmable logic ICs, including Complex Programmable Logic Devices (CPLDs) and Field Programmable Gate Arrays (FPGAs). CPLDs include function blocks based on programmable logic array (PLA) architecture and programmable interconnect lines to route and transmit signals between the function blocks. FPGAs include configurable logic blocks (CLBs) arranged in rows and columns, input output blocks surrounding the CLBs, and programmable interconnect lines that route and transmit signals between the CLBs. Each CLB includes look-up tables and other configurable circuitry that are programmable to implement logic functions. The function blocks of CPLDs, CLBs of FPGAs, and interconnect lines are configured by data stored in a configuration memory of the respective devices.

Designs implemented in programmable logic have become complex. Due to the time and investment required for design and debugging, it is desirable to protect the design from unauthorized copying. Efforts have been made to encrypt designs and provide the encrypted designs to the target devices. Several encryption algorithms, for example, the standard Data Encryption Standard (DES) and the more secure Advanced Encryption Standard (AES) algorithms, are known for encrypting blocks of data. Additionally, a one-time encryption pad may be used as a cipher for encrypting blocks of data by XORing blocks of data with blocks of the one-time pad (OTP). These approaches require provision of a key, corresponding to the particular encryption algorithm, and the key must be protected from unauthorized discovery.

A decryption key can be stored in nonvolatile memory of a programmable integrated circuit. An encrypted bitstream can then be loaded into the IC and decrypted using the key within the programmable logic. This prevents an attacker from reading the bitstream as it is being loaded into the programmable logic IC. However, this structure must also protect from modes of attack in which the attacker attempts to obtain the decryption key stored in the programmable IC. If the attacker obtains the decryption key, the attacker can decrypt an intercepted bitstream to reveal the unencrypted design.

One method through which an attacker may attempt to discover the decryption key is known as power analysis. In a power analysis attack, current used by a device is monitored while the device is decrypting the bitstream. During normal operation, the amount of power used by a device varies depending on the logic gates activated at a given time. By monitoring variations in the power consumption while the device is decrypting a configuration bitstream, the attacker can identify decryption operations performed and determine the decryption key. In another type of attack, an attacker attempts to guess a key, password or authentication code using many trial-and-error attempts. The attacker may attempt to determine the key value or force the device to accept tampered data as if it were legitimate.

SUMMARY

A circuit for detecting power analysis attacks includes at least one load circuit, a power supply line configured to provide a supply voltage, and a switch coupled to the load circuit and to the power supply line. The switch is configured to enable and disable the at least one load circuit. A voltage monitor is configured to sample voltage levels of the supply voltage, and a detection circuit is coupled to the switch and to the voltage monitor. The detection circuit is configured to generate control signals to the switch for enabling and disabling the at least one load circuit, compare a first voltage level sampled when the at least one load circuit is disabled to a second voltage level sampled when the at least one load circuit is enabled, and generate an attack-detection signal in response to a difference between the sampled first voltage level and the sampled second voltage level being greater than a threshold voltage level.

A method of detecting power analysis attacks includes generating control signals to a switch for enabling and disabling at least one load circuit. A first voltage level sampled when the at least one load circuit is disabled is compared to a second voltage level sampled when the at least one load circuit is enabled. In response to a difference between the sampled first voltage level and the sampled second voltage level being greater than a threshold voltage level, an attack-detection signal is generated.

A circuit for detecting power analysis attacks uses a current monitor. The circuit includes at least one load circuit, a power supply line configured to provide a supply voltage, and a switch coupled to the load circuit and to the power supply line. The switch is configured to enable and disable the at least one load circuit. The current monitor is configured to sample current levels of the power supply line. A detection circuit is coupled to the switch and to the current monitor. The detection circuit is configured to generate control signals to the switch for enabling and disabling to the at least one load circuit, compare a first current level sampled when the at least one load circuit is disabled to a second current level sampled when the at least one load circuit is enabled, and generate a shut-down signal in response to a difference between the sampled first current level and the sampled second current level being greater than a threshold current level.

Other embodiments will be recognized from consideration of the Detailed Description and Claims, which follow.

BRIEF DESCRIPTION OF THE DRAWINGS

Various aspects and advantages of the disclosed embodiments will become apparent upon review of the following detailed description and upon reference to the drawings, in which:

FIG. 7 shows a timeline of multiple samples taken for one load while the load is switched-off and multiple samples taken while the load is switched-on.

DETAILED DESCRIPTION

Figure 1:
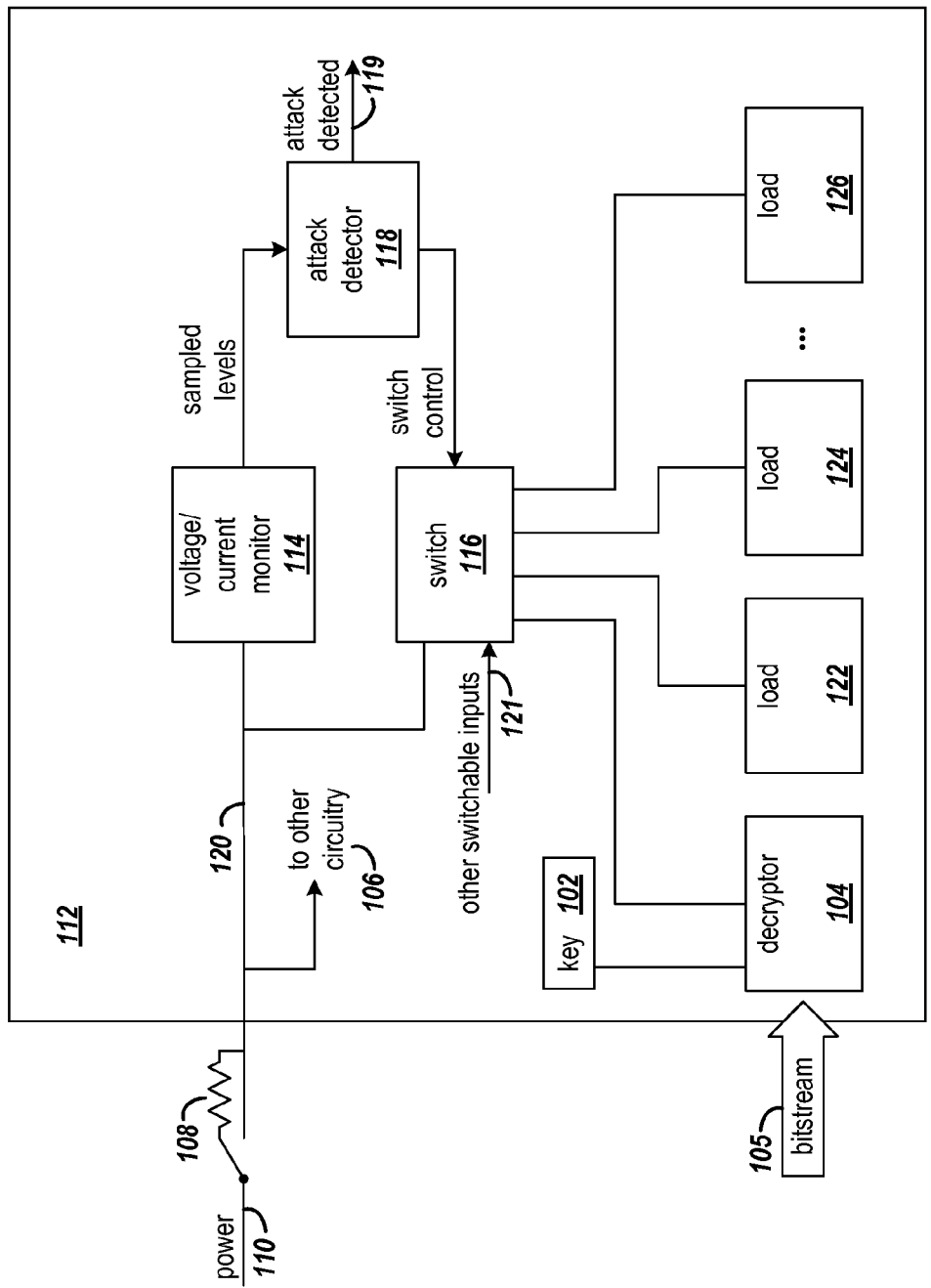
FIG. 1 shows an exemplary circuit for detecting power analysis attacks.

During the configuration of programmable logic, the configuration bitstream data can be intercepted and used to make unauthorized copies of the design. Although the configuration bitstream can be encrypted, the decryption key or other sensitive data may be vulnerable to discovery through brute-force trial-and-error attacks or side-channel attacks such as analysis of electromagnetic radiation or power analysis. In a power analysis attack, current used by a device is monitored over time. During normal operation, the amount of power used by a device varies depending on the logic gates activated at a given time. By monitoring variations in the power consumption during the decryption process, the attacker can identify operations that are performed and determine the decryption key.

In a simple power analysis (SPA) attack, the current used by a device is monitored over time. During normal operation, the amount of power used by a device varies depending on the logic gates activated at a given time. By monitoring variations in the power consumption, the attacker can identify different operations that are performed. For example, if a programmable IC implements DES encryption, sixteen rounds of encryption/decryption are performed on each block of data. Because similar operations are performed for each round, a typical power trace will show 16 repetitions of a common pattern, one corresponding to each round. Comparison of power consumption of different rounds and the same round over multiple decryptions can identify key-dependent operations and, ultimately, the key used for decryption. For example, the DES key schedule is produced by rotating 28-bit key registers. The rotations are generally implemented using a right shift operation where a zero is shifted into the most significant bit by default. If the bit of the key shifted out of the register is a one, an additional operation is needed to cause the most significant bit to be equal to one. Therefore, a different power signature will be produced for each rotation depending on the bit of the decryption key.

In a differential power analysis (DPA) attack, the difference in the power consumption between decrypting two different blocks of ciphertext can be used to extract information about the key. For example, in one step in many encryption and decryption operations, the ciphertext, or a value deterministically derived from the ciphertext, is EXCLUSIVE-ORed (XOR) with the key or a subkey derived deterministically from the key. An attacker can observe the ciphertext and can watch for the difference in power consumption between those ciphertext values expected to produce a 1 output from the XOR versus those expected to produce a 0, for some assumption of the key value. The attacker may attempt a large number of executions of the decryptor by providing a large amount of data to be decrypted. The attacker guesses a key value and averages together the subset of the power traces of those executions of the decryptor that are expected to produce the same value from the XOR function if the guess was correct. If that result differs significantly from the average of all executions of the decryptor, the attacker can conclude that the guess of the key value was correct. If incorrect, the attacker assumes a different key value and averages different subsets of the power traces from the large number of trials. This attack requires a large number of trials to ensure success.

As used herein, a power signature may be referred to as power fluctuations, a power consumption signature, or a power consumption waveform, and such terms are used interchangeably herein. Other encryption ciphers, including both symmetric and asymmetric ciphers, also include key dependent operations that are susceptible to power analysis. One skilled in the art will recognize that the present invention is applicable to protecting key data or other sensitive data used by a number of synchronous and asynchronous encryption and decryption algorithms such as DES, DES-3, Blowfish, RSA, DSA, etc., as well as other algorithms that merely handle decrypted sensitive data.

Throughout this description references are made to keys or key data. Those skilled in the art will recognize that key data is one example of data that is intended to be protected. Other kinds of data also fall within the scope of this invention. Also, reference is made to encryption and decryption throughout the description. Those skilled in the art will recognize that these are examples of operations performed using key data, where the key data is an example of data that must be kept secret. Although an example involving decryption is described, operations other than decryption also fall within the scope of the present invention.

Some approaches for detecting power analysis attacks monitor the power supply line of the device after the device has been configured. For example, after the programmable resources of an FPGA have been configured with an input configuration bitstream, voltage and/or current levels on the power supply line may be monitored for changes and those changes may be evaluated based on those parts (logic cores) of the implemented circuit that are operating and known voltage and/or current levels on the power supply line when those parts of the implemented circuit are operating. This approach can detect power analysis attacks on data inside the configured FPGA. However, it provides protection too late to protect against power analysis attacks prior to the device having been configured or while the device is being configured.

One type of power analysis attack may be directed at learning the decryption key that is used by an FPGA to decrypt an input configuration bitstream for configuring the device. Since the FPGA is not yet configured in such an attack, approaches that rely on programmable logic or logic cores of the bitstream having been configured in the device are unsuitable.

The disclosure describes circuits that detect power analysis attacks by monitoring the voltage or current on the power supply line of the protected circuit or device. In a power analysis attack, the attacker typically places a shunt resistor on the power supply line to the target circuit/device and/or removes bypass capacitors and monitors the voltage drop across the resistor while the target circuit/device is operating. To detect such an attack, protection circuitry can be connected to the power supply line, and the voltage/current level can be measured while a known current load is disabled and while the known current load is enabled. If the voltage/current level on the power supply line drops more than expected, the power supply is considered to have been compromised. Though the drop on the power supply line may be caused by an attacker or by an innocent improper connection, an alert signal is raised since either countermeasures or corrective actions are desirable. Therefore, the circuit detects not only malicious power analysis attacks, but also poor power supply design.

FIG. 1 shows an exemplary circuit for detecting power analysis attacks. The power analysis attacks may be directed at use of a key 102 by a decryptor 104 in decrypting configuration bitstream 105, or the use of other sensitive data by other circuitry 106. As explained above, a power analysis attack may involve the use of a shunt resistor 108 in the power supply line 110 or ground line (not shown) connected to the device 112 under attack. Alternatively, the attacker may simply limit the current supplied to the chip or limit or remove bypass capacitors in an attempt to make power fluctuations more measurable.

The circuit of FIG. 1 includes a voltage/current monitor 114, a switch 116 that is coupled to one or more loads, and an attack detector 118 that is coupled to the voltage monitor and to the power switch. The voltage/current monitor 114 is connected to the power supply line 120 within the device 112. The monitor 114 is designated as a voltage/current monitor since either voltage or current levels may be measured for detecting a power analysis attack. Thus, the monitor 114 may only measure voltage levels, only measure current levels, or measure both voltage and current levels. Though either a voltage monitor or a current monitor may be used in the attack detection circuitry, for ease of exposition, the voltage/current monitor may sometimes be referred to herein as simply a voltage monitor which provides sampled voltage levels. Some devices, such as FPGAs from XILINX, Inc., include system monitor circuitry that provides the functions of the voltage monitor 114. In other implementations, custom circuitry may be included in the device 112 for sampling voltage or current levels.

The attack detector 118 detects a power analysis attack by comparing a voltage level(s) sampled when the switch 116 has disabled a load, to a voltage level(s) sampled when the switch has enabled the load. The attack detector provides control signals to the switch for enabling (switching-on) and disabling (switching-off) a load and receives the sampled voltage levels from the voltage monitor 114. The attack detector puts attack-detection signal 119 into a first state in response to the difference between the voltage level sampled when the load is switched-off and the voltage level sampled when the load is switched-on being greater than a threshold voltage level; otherwise, the attack-detection signal 119 is put into a second state. The first state indicates that an attack is detected with the sampled voltage levels, and the second state indicates that no attack is detected with the sampled voltage levels. In some embodiments, no switching is required, and an attack is detected based on the voltage level of the power supply; a low voltage level implies a power supply current restriction and an attack. In some embodiments the range of, or variation in, voltage levels or current load levels during normal operation is used to detect an attack. A large voltage swing indicates excess information being leaked to a potential attacker.

The threshold voltage level may be determined through testing the device 112 prior to having made the device generally available and accessible to attackers. For example, the difference between the voltage level on the power supply line when the load is switched-off and when the load is switched-on may be determined by the designer of the device. The threshold may be made the difference plus some acceptable margin of error.

In one embodiment, the detection circuitry includes only one load that is switched-on and switched-off. In another embodiment, the detection circuitry may include multiple loads with a different one of the loads being switched-on and switched-off at different times as explained further below. The load that is switched may be the decryptor 104 that is targeted by the power analysis attack or a part of the decryptor that is used periodically such as the key generator or SBOX computation, or another load implemented for use with the attack detection circuitry. Since an attacker must measure voltage when the decyrptor is handling the sensitive key data, using the decryptor as the load improves the chance of detecting the attack. The load may alternatively be a hardwired oscillator, an oscillator configured in programmable logic, or a power-to-ground short circuit through a known resistance, for example.

The switch 116, which is coupled to the load circuit(s) and to the power supply line 120, may be an integrated circuit power switch that switches-on and switches-off power to the load. Alternatively, the switch 116 may be a switch that switches-on and switches-off a clock enable signal to an oscillator or other circuit, or switches-on and switches-off input data to a logic circuit such as a decryptor. Signals such as a clock signal and input data that may be switched-on and switched-off to a load are shown as input line 121 to the switch 116. As used herein, the terms enable and switch-on may be used interchangeably. Similarly, the terms disable and switch-off may be used interchangeably.

The switching-off and switching-on of one or more loads allow a comparison of voltage levels, to avoid disabling the device if it is intentionally being operated at reduced voltage. The switching also prevents an attacker from avoiding a detector that does not switch a load but makes periodic checks for changes in voltage level. To avoid such a detector, the attacker may attempt to switch-in the shunt resistor during intervals of time when the detector is not sampling the voltage level and switch-out the shunt resistor in intervals when the detector is sampling the voltage level.

The attack detection circuitry may be implemented with just one load, or with multiple loads 104, 122, 124, and 126. The sampled voltage levels may be examined by the attack detector 118 at regular intervals of time or at pseudo-random or true-random intervals of time. In an implementation having multiple loads, the attack detector 118 may control the power switch 116 to switch-on and switch-off different individual ones of the loads at different times and evaluate the sampled voltage levels accordingly. Loads may be switched-on and switched-off quickly or slowly to deter detection of the switching.

Figure 2:
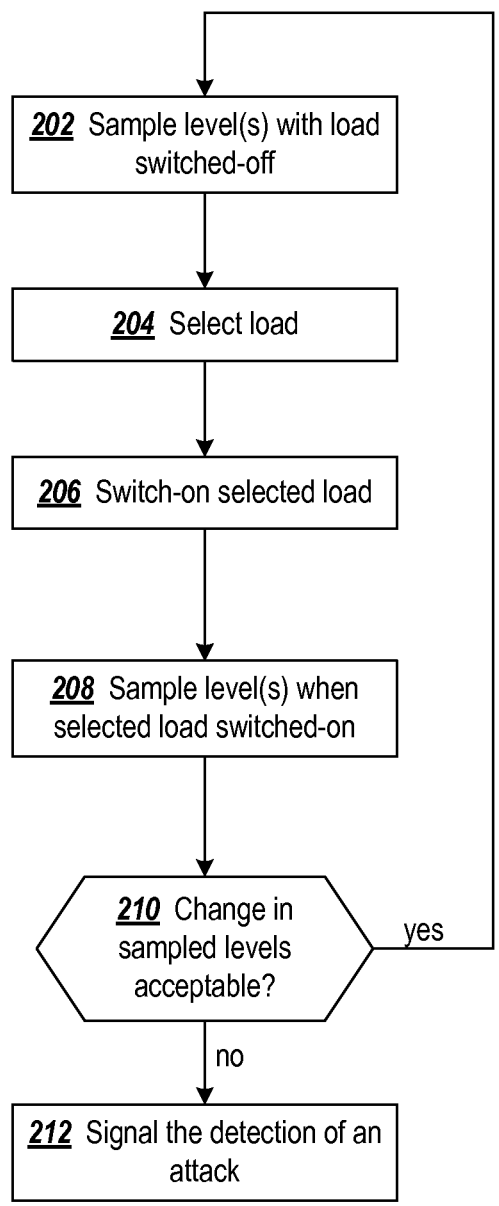
FIG. 2 is a flowchart of an exemplary process for detecting a power analysis attack.

FIG. 2 is a flowchart of an exemplary process for detecting a power analysis attack. At block 202, a voltage level is sampled with a load switched-off. As explained above, the load may be disconnected from the power supply line, the clock signal to a clock enable port of the load may be disabled, or input data to the load may be switched-off.

In an embodiment having multiple loads, at block 204 one of the loads is selected. For embodiments having only one load, no selection of a load would be required. The load is switched-on at block 206, and the voltage level is sampled when the load is switched-off at block 208. If the change in sampled voltage levels is not acceptable, for example, the change is greater than a threshold voltage level, block 210 directs the process to block 212 where an attack-detection signal is put into a first state to indicate that an attack has been detected (when the attack-detection signal is in the second state, no attack is being detected). The response to the detected attack with the attack-detection signal being in the first state may vary according to the application. For example, the device may be shut down or other countermeasures may be taken to divert the attacker. Such countermeasures may include continuing to decrypt using an alternative key or decrypting using alternative input data to the attacker's input data. Another countermeasure may include increasing a threat-level value in response to the attack-detection signal being in the first state (the sampled voltage levels are out of range) and optionally decreasing the threat-level value in response to the attack-detection signal being in the second state (the sampled voltage levels are within range). Once the threat-level value reaches or exceeds a limit value, further countermeasures may be performed. This threat-level countermeasure would limit improper countermeasures in an environment in which the voltage is expected to vary, such as when a device is doing additional computation simultaneously with handling sensitive data.

The general process of FIG. 2 is adaptable to a number of variations, as explained below in the description of FIGS. 3-7.

Figure 3:
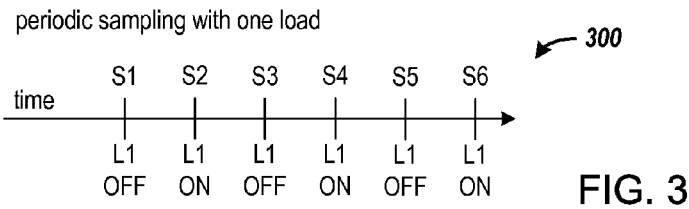
FIG. 3 shows a timeline of samples taken periodically for one load.

FIG. 3 shows a timeline 300 of samples taken periodically for one load. Each mark on the timeline corresponds to one of samples S1-S6, and the label below each mark indicates whether load L1 is switched-on or switched-off. The spacing between samples is approximately equal to illustrate that the samples are taken periodically, and the load L1 is switched-on and switched-off between the samples.

Figure 4:
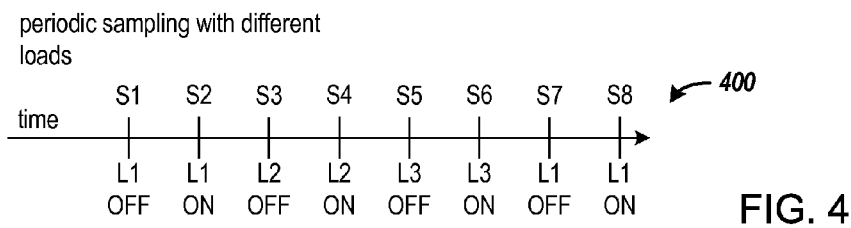
FIG. 4 shows a timeline of samples taken periodically for multiple loads.

FIG. 4 shows a timeline 400 of samples taken periodically for multiple loads. The example timeline shows samples for loads L1, L2, and L3. Samples S1 and S2 are taken with load L1 switched-off and switched-on, respectively; samples S3 and S4 are taken for load L2 switched-off and switched-on, respectively; samples S5 and S6 are taken for load L3 switched-off and switched-on, respectively; and samples S7 and S8 are taken for load L1 switched-off and switched-on, respectively.

In one embodiment, only one load is switched-on at a time. Thus, for example, when sample S2 is taken only load L1 is switched-on. In an alternative embodiment, multiple loads may be switched-on when a sample is taken, with the threshold voltage for triggering an alert established accordingly.

Figure 5:
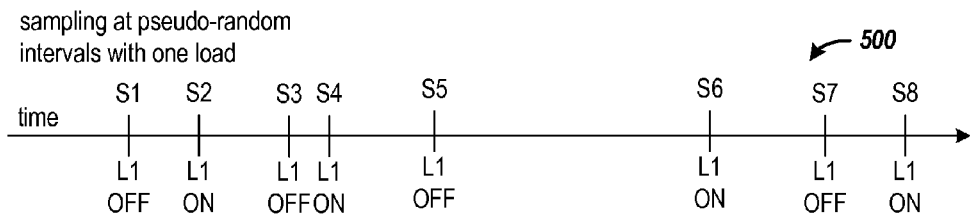
FIG. 5 shows a timeline of samples taken at pseudo-random intervals for one load.

FIG. 5 shows a timeline 500 of samples taken at pseudo-random intervals of time for one load. As shown in FIG. 2, pairs of samples are used in determining whether or not the change in voltage level is greater than a threshold. In FIG. 5, for example, the determination is made for sample pairs S1 and S2, S3 and S4, S5 and S6, and S7 and S8. Using pseudo-random intervals, the interval between the switched-on and switched-off samples of a sample pair may vary pseudo-randomly from one sample pair to another sample pair. The interval between the times at which the sample pairs are taken may also be varied pseudo-randomly. For example, the interval between S2 and S3, the interval between S4 and S5, and the interval between S6 and S7 may vary pseudo-randomly. It will be appreciated that the pseudo-random intervals between samples of a sample pair may be used alone or in combination with pseudo-random intervals between sample pairs. Similarly, the pseudo-random intervals between sample pairs may be used alone.

Figure 6:
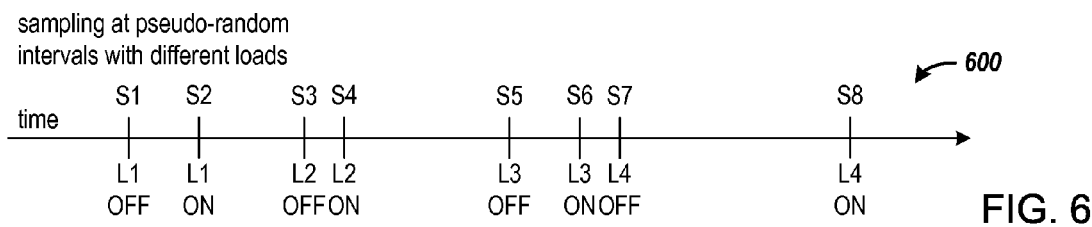
FIG. 6 shows a timeline of samples taken at pseudo-random intervals for multiple loads.

FIG. 6 shows a timeline 600 of samples taken at pseudo-random intervals of time for multiple loads. Samples are taken over loads L1, L2, L3, and L4 being switched-off and switched-on. The interval between the switched-on and switched-off samples of a sample pair may vary pseudo-randomly from one sample pair to another sample pair. The intervals between the times at which the sample pairs are taken may also be varied pseudo-randomly. The pseudo-random variation of intervals between samples of sample pairs may be used alone or in combination with the pseudo-random variation of intervals between sample pairs.

Figure 7:
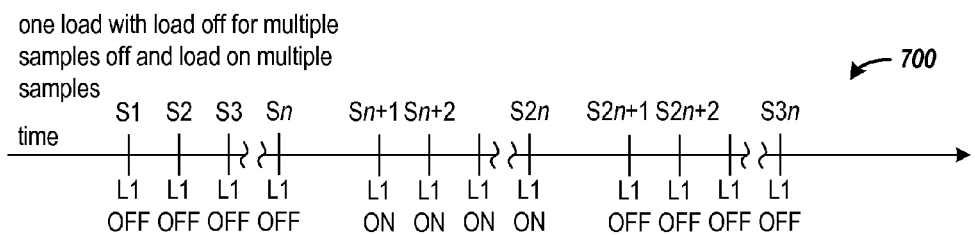

FIG. 7 shows a timeline 700 of multiple samples taken for one load while the load is switched-off and multiple samples taken while the load is switched-on. Samples S1-Sn are taken while load L1 is switched-off, and samples Sn+1-S2n are taken when L1 is switched-on. In one embodiment, the samples taken when the load is switched-off are summed to a first value, and the samples taken when the load is switched-on are summed to a second value. If the difference between the first and second sums exceeds the threshold value, an attack may be indicated. In another embodiment, a first average is calculated for the samples taken when the load is switched-off, and a second average is calculated for the samples taken when the load is switched-on. The difference between the first and second averages may be used to compare to the threshold value. Different samples taken from the two sample sets may be used in other embodiments, such as using the samples with the least values from the two sets of sampled values, using the samples with the greatest values from the two sets of sampled values, or using the sample with the least value from one set and the sample with the greatest value from the other set. In yet another embodiment, the samples of multiple sets of samples with the load switched-off may be used to compare to the samples of multiple sets of samples with the load switched-on. In still other embodiments, multiple loads may be used in the approach shown by FIG. 7 with intervals of time between samples and/or sample sets being periodic or pseudo-random as described above.

The foregoing discussion has described the operation of the exemplary circuit and method in terms of operating with a load(s) disabled or switched-off and then enabling or switching-on the load(s) and detecting a greater than expected drop in voltage level. Equivalently, a load(s) may be transitioned from an enabled or switched-on state to a disabled or switched-off state to detect a greater than expected increase in voltage level. Both operations are considered within the scope of the present invention.

Figure 8:
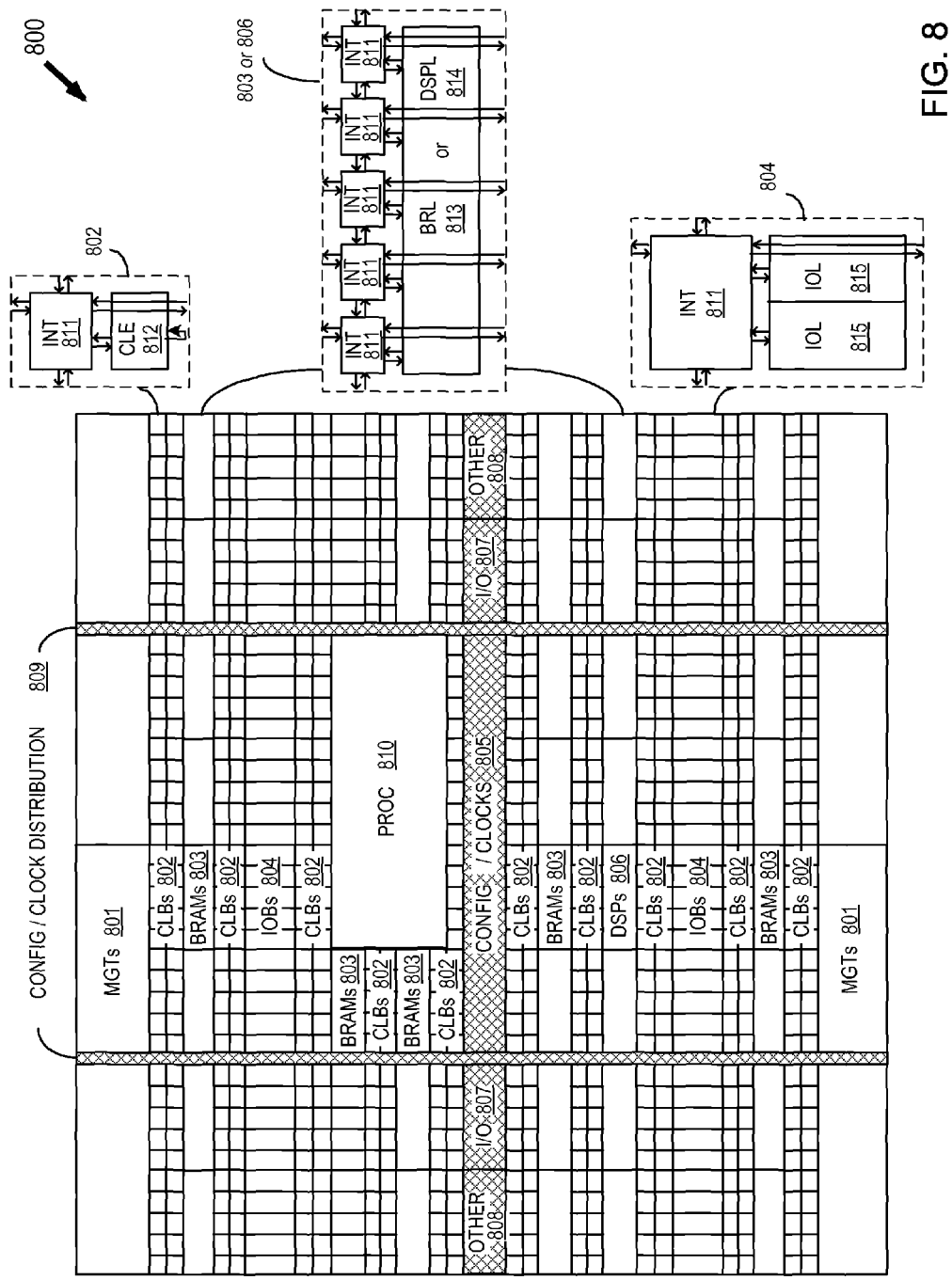
FIG. 8 is a block diagram of an example programmable logic integrated circuit.

FIG. 8 is a block diagram of an example programmable logic integrated circuit that may be used in implementing device 112 of FIG. 1 and power attack detection circuitry. FPGAs can include several different types of programmable logic blocks in the array. For example, FIG. 8 illustrates an FPGA architecture (800) that includes a large number of different programmable tiles including multi-gigabit transceivers (MGTs 801), configurable logic blocks (CLBs 802), random access memory blocks (BRAMs 803), input/output blocks (IOBs 804), configuration and clocking logic (CONFIG/CLOCKS 805), digital signal processing blocks (DSPs 806), specialized input/output blocks (I/O 807), for example, e.g., clock ports, and other programmable logic 808 such as digital clock managers, analog-to-digital converters, system monitoring logic, and so forth. Some FPGAs also include dedicated processor blocks (PROC 810) and internal and external reconfiguration ports (not shown).

In some FPGAs, each programmable tile includes a programmable interconnect element (INT 811) having standardized connections to and from a corresponding interconnect element in each adjacent tile. Therefore, the programmable interconnect elements taken together implement the programmable interconnect structure for the illustrated FPGA. The programmable interconnect element INT 811 also includes the connections to and from the programmable logic element within the same tile, as shown by the examples included at the top of FIG. 8.

For example, a CLB 802 can include a configurable logic element CLE 812 that can be programmed to implement user logic plus a single programmable interconnect element INT 811. A BRAM 803 can include a BRAM logic element (BRL 813) in addition to one or more programmable interconnect elements. Typically, the number of interconnect elements included in a tile depends on the width of the tile. In the pictured FPGA, a BRAM tile has the same width as five CLBs, but other numbers (e.g., four) can also be used. A DSP tile 806 can include a DSP logic element (DSPL 814) in addition to an appropriate number of programmable interconnect elements. An IOB 804 can include, for example, two instances of an input/output logic element (IOL 815) in addition to one instance of the programmable interconnect element INT 811. As will be clear to those of skill in the art, the actual I/O pads connected, for example, to the I/O logic element 815 are manufactured using metal layered above the various illustrated logic blocks, and typically are not confined to the area of the input/output logic element 815.

In the pictured FPGA, a horizontal area near the center of the die (shown shaded in FIG. 8) is used for configuration, clock, and other control logic. Vertical areas 809 extending from this horizontal area are used to distribute the clocks and configuration signals across the breadth of the FPGA.

Some FPGAs utilizing the architecture illustrated in FIG. 8 include additional logic blocks that disrupt the regular row structure making up a large part of the FPGA. The additional logic blocks can be programmable blocks and/or dedicated logic. For example, the processor block PROC 810 shown in FIG. 8 spans several rows of CLBs and BRAMs.

Note that FIG. 8 is intended to illustrate only an exemplary FPGA architecture. The numbers of logic blocks in a row, the relative heights of the rows, the number and order of rows, the types of logic blocks included in the rows, the relative sizes of the logic blocks, and the interconnect/logic implementations included at the top of FIG. 8 are purely exemplary. For example, in an actual FPGA more than one adjacent row of CLBs is typically included wherever the CLBs appear, to facilitate the efficient implementation of user logic.

Other aspects and embodiments will be apparent to those skilled in the art from consideration of the specification. For example, the exemplary circuit(s) and method(s) described herein may be implemented as one or more processors configured to execute software, as an application specific integrated circuit (ASIC), or as a logic on a fixed-logic or programmable logic device. It is intended that the specification and illustrated embodiments be considered as examples only, with a true scope of the invention being indicated by the following claims.

What is claimed is:

1. A circuit for detecting power analysis attacks, comprising:
   at least one load circuit;
   a power supply line configured to provide a supply voltage;
   a switch coupled to the load circuit and to the power supply line, the switch configured to enable and disable the at least one load circuit;
   a voltage monitor configured to sample voltage levels of the supply voltage; and
   a detection circuit coupled to the switch and to the voltage monitor, the detection circuit configured to:
   generate control signals to the switch for enabling and disabling the at least one load circuit;
   compare a first voltage level sampled when the at least one load circuit is disabled to a second voltage level sampled when the at least one load circuit is enabled; and
   generate an attack-detection signal in response to a difference between the sampled first voltage level and the sampled second voltage level being greater than a threshold voltage level.

2. The circuit of claim 1, wherein the detection circuit is further configured to:
   accumulate a plurality of sampled first voltage levels when the at least one load circuit is disabled;
   accumulate a plurality of sampled second voltage levels when the at least one load circuit is enabled; and
   generate the attack-detection signal in response to a difference between the sampled first voltage levels and the sampled second voltage levels being greater than a threshold voltage level.

3. The circuit of claim 1, wherein the at least one load circuit includes a plurality of load circuits, and the switch is coupled to the plurality of load circuits.

4. The circuit of claim 3, wherein the detection circuit is further configured to generate the control signals to the switch for enabling and disabling different ones of the plurality of load circuits in different time intervals.

5. The circuit of claim 4, wherein the detection circuit is further configured to generate the control signals to the switch for enabling and disabling the plurality of load circuits at pseudo-random time intervals.

6. The circuit of claim 1, wherein the at least one load circuit is a ring oscillator.

7. The circuit of claim 1, wherein the at least one load circuit includes a resistor that connects the supply voltage to ground.

8. The circuit of claim 1, wherein the at least one load circuit is a decryption circuit.

9. The circuit of claim 1, wherein the detection circuit is further configured to generate the control signals to the switch for enabling and disabling the at least one load circuit at pseudo-random time intervals.

10. A method of detecting power analysis attacks, comprising:
    generating control signals to a switch for enabling and disabling at least one load circuit;
    comparing a first voltage level sampled when the at least one load circuit is disabled to a second voltage level sampled when the at least one load circuit is enabled; and
    putting an attack-detection signal into a first state in response to a difference between the sampled first voltage level and the sampled second voltage level being greater than a threshold voltage level.

11. The method of claim 10, further comprising:
    accumulating a plurality of sampled first voltage levels when the at least one load circuit is disabled;
    accumulating a plurality of sampled second voltage levels when the at least one load circuit is enabled; and
    putting the attack-detection signal into the first state in response to a difference between the sampled first voltage levels and the sampled second voltage levels being greater than a threshold voltage level.

12. The method of claim 10, wherein:
    the at least one load circuit includes a plurality of load circuits; and
    the generating of the control signals to the switch includes generating the control signals for enabling and disabling different ones of the plurality of load circuits in different time intervals.

13. The method of claim 12, wherein the generating of the control signals to the switch includes generating the control signals to the switch for enabling and disabling the plurality of load circuits at pseudo-random time intervals.

14. The method of claim 10, wherein the generating of the control signals to the switch for enabling and disabling the at least one load circuit includes generating the control signals for enabling and disabling a ring oscillator.

15. The method of claim 10, further comprising:
    providing a supply voltage;
    wherein the generating of the control signals to the switch for enabling and disabling the at least one load circuit includes generating the control signals for enabling and disabling a resistor that connects the supply voltage to ground.

16. The method of claim 10, wherein the generating of the control signals to the switch for enabling and disabling the at least one load circuit includes generating the control signals for enabling and disabling a decryption circuit.

17. The method of claim 10, wherein the generating of the control signals to the switch for enabling and disabling the at least one load circuit includes generating the control signals to the switch for enabling and disabling the at least one load circuit at pseudo-random time intervals.

18. The method of claim 10, further comprising:
- increasing a threat-level value in response to the attack-detection signal being in the first state;
- decreasing the threat-level value in response to the attack-detection signal being in the second state; and
- performing a countermeasure in response to the threat-level value being greater than a limit value.

19. A circuit for detecting power analysis attacks, comprising:
- at least one load circuit;
- a power supply line configured to provide a supply voltage;
- a switch coupled to the load circuit and to the power supply line, the switch configured to enable and disable the at least one load circuit;
- a current monitor configured to sample current levels of the power supply line; and
- a detection circuit coupled to the switch and to the current monitor, the detection circuit configured to:
  - generate control signals to the switch for enabling and disabling to the at least one load circuit;
  - compare a first current level sampled when the at least one load circuit is disabled to a second current level sampled when the at least one load circuit is enabled; and
  - generate a shut-down signal in response to a difference between the sampled first current level and the sampled second current level being greater than a threshold current level.

20. The circuit of claim 19, wherein the detection circuit is further configured to generate the control signals to the switch for enabling and disabling a plurality of load circuits at pseudo-random time intervals.

* * * * *